F. W. MARGETTS.
SPRING WHEEL FOR VEHICLES.
APPLICATION FILED DEC. 10, 1907.
950,049.
Patented Feb. 22, 1910.
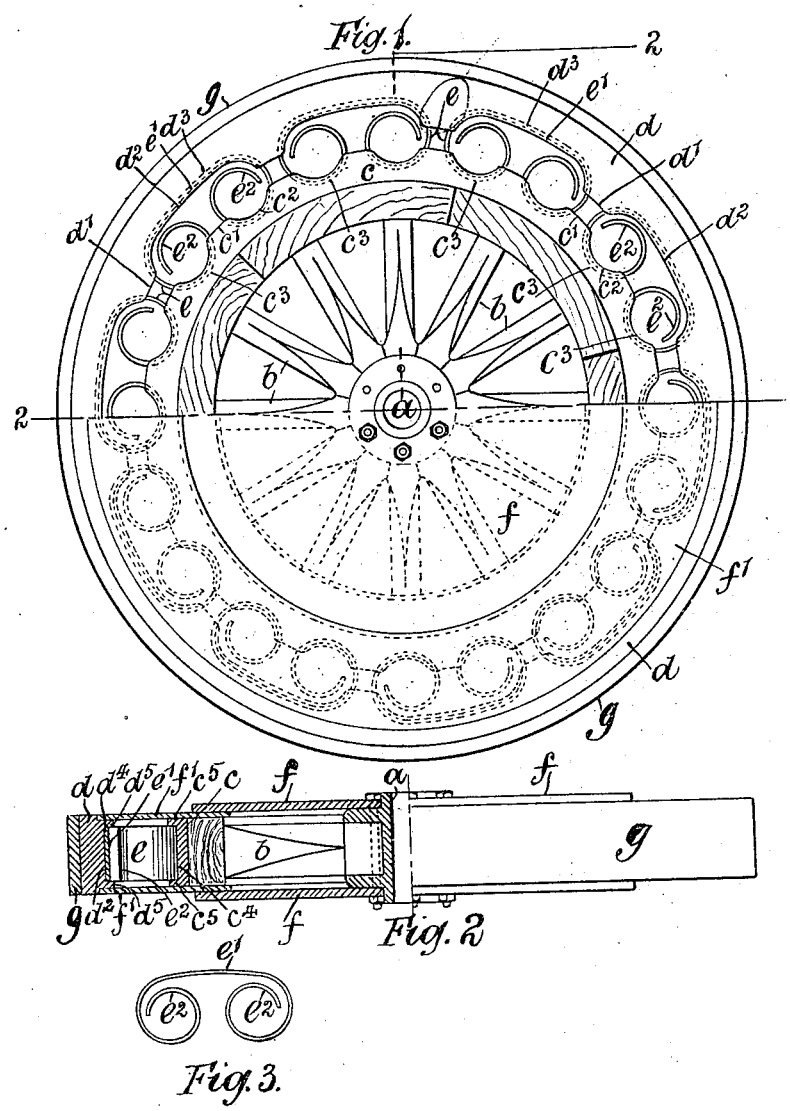

UNITED STATES PATENT OFFICE.

FREDERICK WILLIAM MARGETTS, OF EAST DULWICH, ENGLAND.

SPRING-WHEEL FOR VEHICLES.

950,049.

Specification of Letters Patent. Patented Feb. 22, 1910.

Application filed December 10, 1907. Serial No. 405,961.

*To all whom it may concern:*

Be it known that I, FREDERICK WILLIAM MARGETTS, a subject of the King of Great Britain, residing at 11 Bawdale road, East Dulwich, in the county of Surrey, England, mechanical engineer, have invented certain new and useful Improvements in Spring-Wheels for Vehicles, of which the following is a specification.

This invention relates to vehicle wheels of the kind made up of hub and rim portions having radial projections with interposed resilient devices which serve to keep the hub and rim parts concentric and form driving means whereby the parts of the wheel are caused to rotate together.

Various arrangements of wheels of the character described have been proposed wherein the resilient devices have been made in the form of rubber balls or solid rubber rollers; these however are not satisfactory in use as rubber is affected by variations of temperature and tends to become deformed after being heavily loaded continuously for some hours. Hence such wheels are not suitable for heavy motor cars and such like vehicles which are frequently stored and kept in one position for an appreciable length of time.

The object of my invention is to produce a wheel of the kind referred to wherein the desired resiliency and driving effect are obtained by means of curved plate springs made of metal and arranged singly in suitably shaped recesses formed in the inner and outer rim portions of the wheel.

In the accompanying drawings Figure 1 is a side elevation, half in section, of a wheel constructed according to my invention, Fig. 2 is an end elevation of same half in section on the line 2—2 of Fig. 1, Fig. 3 is a detached view of one of the metal springs.

The same parts are lettered to correspond in all the figures.

In these drawings $a$ represents the hub, $b$ the spokes and $c$ the periphery of the inner rim portion which is uniformly corrugated all around as shown in Fig. 1 forming transverse ridges $c'$ and valleys $c^2$.

The outer rim portion comprises the ordinary felly $d$ with a metal tire $g$ (which may, if desired, be a rubber tire) the felly being uniformly corrugated on its interior surface forming transverse ridges $d'$ and long valleys $d^2$. The valleys $d^2$ of the corrugations in the outer rim portion and the valleys $c^2$ of the corrugations in the periphery of the inner rim portion $c$ are undercut or rabbeted as shown by the dotted lines $d^3$ and $c^3$ in Fig. 1, so as to form recesses $d^4$ and $c^4$ into which the correspondingly shaped plate metal springs $e$ are sprung, the remaining or uncut away parts adjacent to the recesses $d^4$ and $c^4$ forming flanges $d^5$ and $c^5$ which prevent lateral displacement of the springs $e$ (see Fig. 2).

The springs $e$ are provided, as shown in Fig. 3, with a back plate $e'$ and with two inwardly curved ends $e^2$, the latter being adapted to fit into two adjacent valleys $c^3$ of the corrugations in the inner rim portion while the back plate $e'$ of the spring fits into one of the valleys in the outer rim portion of the wheel.

The wheel is provided with guard or cover plates $f$ and $f'$ on both sides to exclude dust; these plates are respectively secured to the inner and outer rim portions of the wheel so as to overlap as shown in Fig. 2.

Having fully described my invention, what I claim and desire to secure by Letters Patent is:—

In spring wheels for vehicles, the combination of an inner rim portion having corrugations forming transverse ridges $c'$ and valleys $c^2$, an outer rim portion having corrugations forming transverse ridges $d'$ and long valleys $d^2$, the valleys $c^2$, $d^3$, being undercut to form recesses $c^4$, $d^4$, and the parts adjacent to the latter recesses forming lateral flanges $c^5$, $d^5$, and plate springs arranged intermediate of the inner and outer rim portions and having long backs fitting in the undercut recesses $d^4$ and also having inwardly curved ends fitting in the undercut recesses $c^4$, said springs being prevented from lateral displacement by the flanges $c^5$, $d^5$, all arranged as and for the purposes specified.

In testimony whereof I have hereunto set my hand in presence of two subscribing witnesses this 26 day of November 1907.

FREDERICK WILLIAM MARGETTS.

Witnesses:
BERNARD GOLBY,
H. D. JAMESON.